J. TESSIER.
CAMERA LENS AND DIAPHRAGM ADJUSTING MECHANISM.
APPLICATION FILED APR. 30, 1913.

1,152,238.

Patented Aug. 31, 1915.
2 SHEETS—SHEET 1.

WITNESSES:

INVENTOR
Julien Tessier,
BY
Charles N. Butler
ATTORNEY.

J. TESSIER.
CAMERA LENS AND DIAPHRAGM ADJUSTING MECHANISM.
APPLICATION FILED APR. 30, 1913.

Patented Aug. 31, 1915.

WITNESSES:

INVENTOR
Julien Tessier,
BY
Charles N. Butler
ATTORNEY.

UNITED STATES PATENT OFFICE.

JULIEN TESSIER, OF PHILADELPHIA, PENNSYLVANIA, ASSIGNOR TO LUBIN MANUFACTURING COMPANY, OF PHILADELPHIA, PENNSYLVANIA, A CORPORATION OF PENNSYLVANIA.

CAMERA LENS AND DIAPHRAGM ADJUSTING MECHANISM.

1,152,238. Specification of Letters Patent. Patented Aug. 31, 1915.

Application filed April 30, 1913. Serial No. 764,506.

*To all whom it may concern:*

Be it known that I, JULIEN TESSIER, a citizen of the French Republic, residing in the city of Philadelphia, county of Philadelphia and State of Pennsylvania, have invented certain Improvements in Camera Lens and Diaphragm Adjusting Mechanism, of which the following is a specification.

My invention relates to means for adjusting the positions of lenses and varying the light apertures thereof, and my leading object is to provide simple and efficient apparatus whereby exact adjustments can be obtained with different lenses.

The characteristic features of my improvements are fully disclosed in the following description and the accompanying drawings in illustration thereof.

Figure 1:
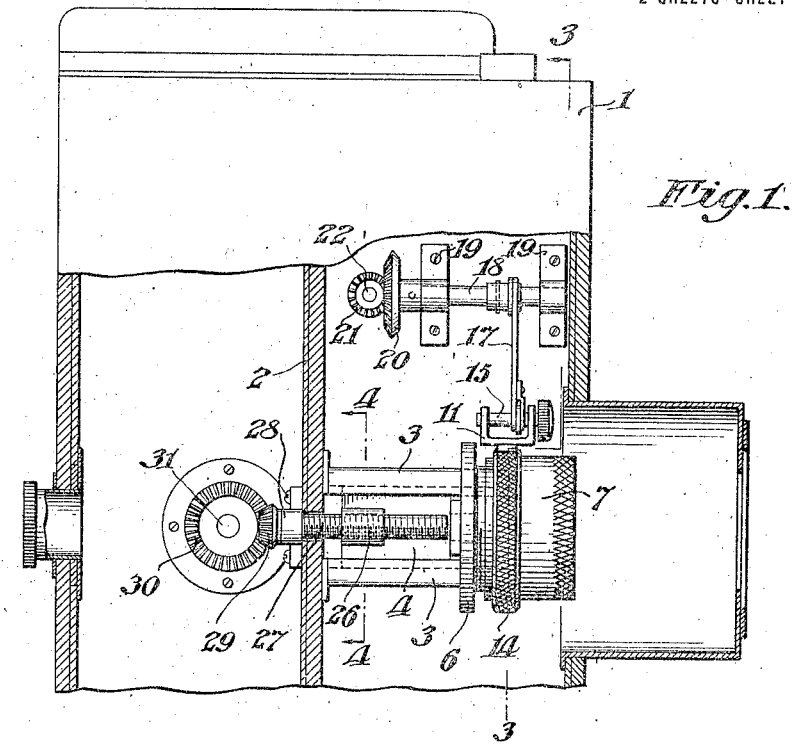
Figures 4, 5:
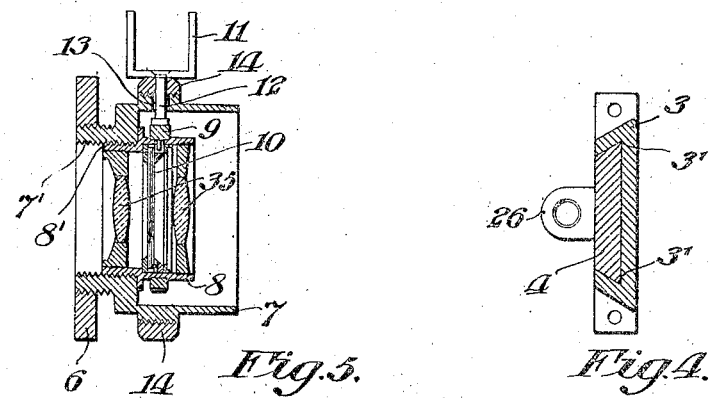
Figure 6:
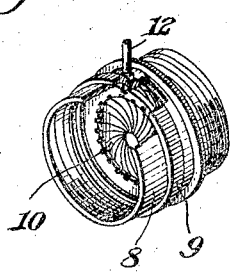
Figure 2:
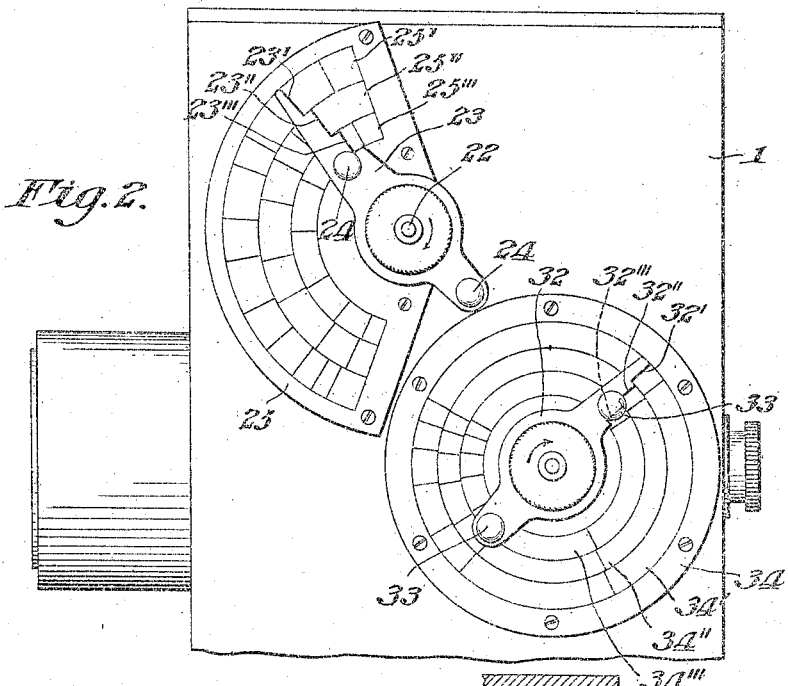
Figure 3:
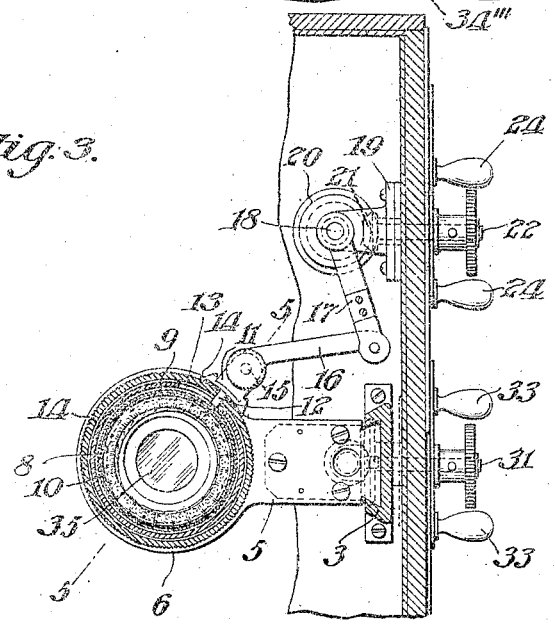

In the drawings, Figure 1 is a broken sectional elevation taken through the axis of a camera having my improvements applied thereto; Fig. 2 is a broken elevation of the same; Fig. 3 is a sectional view taken on the line 3—3 of Fig. 1; Fig. 4 is a sectional view taken on the line 4—4 of Fig. 1; Fig. 5 is a longitudinal sectional view taken on the line 5—5 of Fig. 3; and Fig. 6 is a broken perspective view showing the lens case and connections.

The mechanism, as illustrated in the drawings, comprises the case 1 containing the plate 2 which supports a guide 3 having a dove-tail channel 3′. A dove-tail slide 4, movable in the channel 3′, has fixed thereon an arm 5 which carries an internally threaded ring 6. The lens tube 7 has a reduced threaded part 7′ which is screwed into the ring 6, and the lens case 8 has a reduced threaded part 8′ which is screwed into the part 7′. A ring 9, on the cylindrical case 8, is connected with and operates the diaphragm 10 within the case, and is connected with a yoke 11 by a stud 12 which passes through the slot 13 in the tube 7 and through the ring 14 which is revoluble upon and covers the slot in this tube. A pin or bolt 15 passes through the yoke 11 and a link 16 is movable on the pin between the bifurcations of the yoke, the link 16 being pivotally connected to the arm 17, which is fixed on a shaft 18 fulcrumed in the bearings 19. A beveled gear 20 is fixed on the shaft 18 and meshes with a beveled gear 21 fixed on a journaled shaft 22, the latter having fixed thereon an indicator 23 provided with handles 24. This indicator is provided with stepped indicating sections 23′, 23″, and 23‴ and moves over a dial 25 having concentric graduated scales 25′, 25″ and 25‴ with which the sections 23′, 23″ and 23‴ register. The several scales and corresponding indicating devices are designed for use with several lenses, with respect to which the several indicating devices are complementary.

The slide 4 is provided with an internally threaded hub 26 into which a threaded shaft 27 is screwed, the shaft being journaled in the bearing 28 and having a beveled gear 29 fixed thereon. A beveled gear 30 meshes with the gear 29 and is fixed on a journaled shaft 31 having fixed thereon the indicator 32 adapted to be turned by handles 33. The indicator 32 is provided with stepped indicating parts 32′, 32″ and 32‴, and is movable over a dial 34 having concentric graduations 34′, 34″ and 34‴ complementary to the parts 32′, 32″ and 32‴. These several graduations and indicating devices are also complementary to several lenses with which they are adapted for use.

It will be understood that, in operation, the lens or lenses 35 in the case 8 are focused by turning the arm 32 until the section thereof corresponding to the lens occupies the desired position upon the graduated scale over which it is movable, the arm 32 revolving the shaft 31, the beveled gears 30, 29 and the shaft 27, which acts through the hub 26 to move the slide 4 in the way 3, to adjust the position of the ring 7, which is connected to the slide by the parts 5 and 6. In this adjustment, the pin 15 moves freely through the link 16. The diaphragm is adjusted by turning the indicating arm 23 to effect the desired registration with the graduations corresponding to the style of lens, the arm 23 acting upon the diaphragm through the parts 22, 21, 20, 18, 17, 16, 15, 11, 12 and 9.

Having described my invention, I claim:

1. A camera comprising a casing, a guiding device disposed within and fixed relatively to said casing, a slide controlled by said device, a lens and diaphragm mechanism carried by said slide, said diaphragm mechanism comprising relatively movable parts providing an adjustable aperture, means for moving said slide whereby the position of said lens is adjusted, means comprising a graduated device for setting said lens, means for operating said parts to adjust the aperture of said diaphragm in various positions of said lens, and means comprising a graduated device whereby said diaphragm is set.

2. The combination of a guiding device with a slide provided with an arm having a ring thereon, a lens tube carried by said ring, said tube containing a lens and a case provided with a diaphragm, means comprising a pin parallel to said guide whereby said diaphragm is adjusted, means for moving said slide in said guide, and mechanism relative to which said pin is movable upon the movement of said slide, said mechanism acting through said pin to adjust said diaphragm.

3. The combination of a guide provided with an arm having a ring thereon, a tube engaged in said ring, said tube containing a diaphragm and a lens, a journaled shaft having a threaded connection with the slide whereby said tube is moved longitudinally, a second journaled shaft, gears connecting said shafts, an indicating arm on said second shaft, a dial over which said arm is movable, mechanism for adjusting said diaphragm in various positions of said tube, said mechanism comprising a journaled shaft, a second journaled shaft, an indicator on said last named shaft, a dial over which said last named indicator is movable and gears connecting said last named shafts.

4. The combination of a lens, means comprising a shaft for reciprocating said lens, a diaphragm movable with said lens and having an adjustable aperture, means comprising a shaft disposed substantially parallel to said shaft first named for adjusting said diaphragm aperture, and indicating mechanism for denoting the adjustment of said lens and aperture.

5. A camera comprising a casing, a lens, a reciprocating support in said casing for said lens, means for adjusting said support, a diaphragm for said lens, means comprising a revoluble ring for adjusting said diaphragm, and indicating mechanism comprising a plurality of scales for denoting the correspondence of said diaphragm and support.

6. The combination of a lens, a reciprocating support for said lens, means comprising a shaft for reciprocating said support, a diaphragm for said lens and movable therewith, an oscillating device and a revoluble ring operated thereby for adjusting said diaphragm, and means comprising a shaft for oscillating said device.

In testimony whereof I have hereunto set my hand this 14th day of April, 1913, in the presence of the subscribing witnesses.

JULIEN TESSIER.

Witnesses:
 CHARLES GOLDSMITH,
 Jos. G. DENNY, Jr.